(12) United States Patent
Sakai et al.

(10) Patent No.: US 10,132,464 B2
(45) Date of Patent: Nov. 20, 2018

(54) LIGHT OUTPUT APPARATUS AND IMAGE DISPLAY SYSTEM

(71) Applicant: SEIKO EPSON CORPORATION, Tokyo (JP)

(72) Inventors: Toshihiko Sakai, Matsumoto (JP); Noriyuki Hirano, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 528 days.

(21) Appl. No.: 14/518,326

(22) Filed: Oct. 20, 2014

(65) Prior Publication Data

US 2015/0116216 A1 Apr. 30, 2015

(30) Foreign Application Priority Data

Oct. 31, 2013 (JP) ................................. 2013-226551
Mar. 5, 2014 (JP) ................................. 2014-042453

(51) Int. Cl.
*F21V 5/04* (2006.01)
*G06F 3/042* (2006.01)
(Continued)

(52) U.S. Cl.
CPC ............ *F21V 5/04* (2013.01); *G02B 19/0014* (2013.01); *G02B 19/0052* (2013.01); *G02B 27/0927* (2013.01); *G06F 3/0425* (2013.01)

(58) Field of Classification Search
CPC ... F21V 5/04; G02B 19/0014; G02B 19/0052; G02B 27/0927; G06F 3/0425
(Continued)

(56) References Cited

U.S. PATENT DOCUMENTS 4,826,299 A * 5/1989 Powell .................... G02B 5/04
 359/710
6,421,042 B1 * 7/2002 Omura .................... G06F 3/011
 345/156
(Continued)

FOREIGN PATENT DOCUMENTS

JP H05-94708 U 12/1993
JP 2002-357421 A 12/2002
(Continued)

OTHER PUBLICATIONS

"LED Bulb Beam Angle" https://www.whichledlight.com/bulb-guide/led-bulb-beam-angle Jul. 14, 2016.*
(Continued)

*Primary Examiner* — Evan Dzierzynski
*Assistant Examiner* — Naomi M Wolford
(74) *Attorney, Agent, or Firm* — Oliff PLC

(57) ABSTRACT

A light output apparatus includes a light source that emits light shoving different light orientation distributions in a first direction and a second direction and having a high optical intensity area larger in the first direction than in the second direction, a collimator lens that parallelizes the light emitted from the light source, and a Powell lens that spreads the parallelized light from the collimator lens in the first direction, maintains the parallelized direction provided by the collimator lens in the second direction, and outputs the resultant light along a third direction that is perpendicular to the first and second directions and serves as a central axis.

8 Claims, 9 Drawing Sheets

(51) Int. Cl.
*G02B 27/09* (2006.01)
*G02B 19/00* (2006.01)

(58) Field of Classification Search
USPC .................................. 362/268, 257; 359/642
See application file for complete search history.

(56) References Cited

U.S. PATENT DOCUMENTS

| 2002/0178595 | A1 | 12/2002 | Tamamura |
| 2008/0291164 | A1 | 11/2008 | Tanaka |
| 2012/0002217 | A1* | 1/2012 | Kobayashi ............ G06F 3/0428 356/622 |
| 2012/0147919 | A1 | 6/2012 | Hisanaga et al. |
| 2013/0301058 | A1* | 11/2013 | Nunnink ................ G01B 11/00 356/606 |

FOREIGN PATENT DOCUMENTS

| JP | B2-4757144 | 6/2011 |
| JP | 2012-068892 A | 4/2012 |
| JP | 2012-122844 A | 6/2012 |

OTHER PUBLICATIONS

Nasim et al. "Diode lasers: From laboratory to industry" Optics and Laser Technology 56 (2014) 211-222.*

* cited by examiner

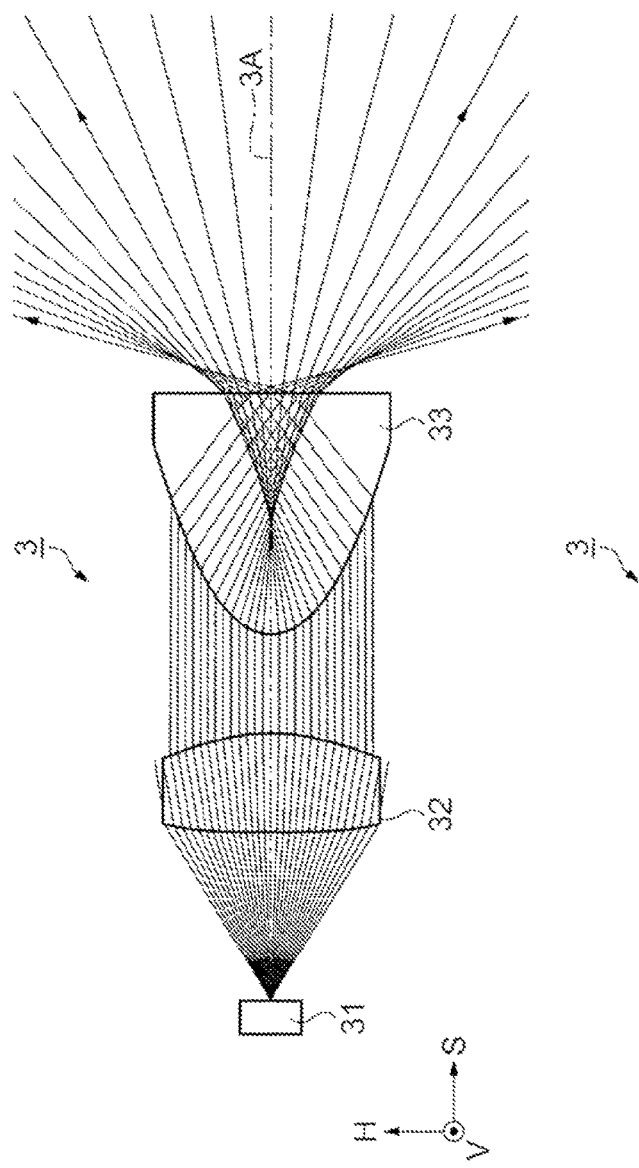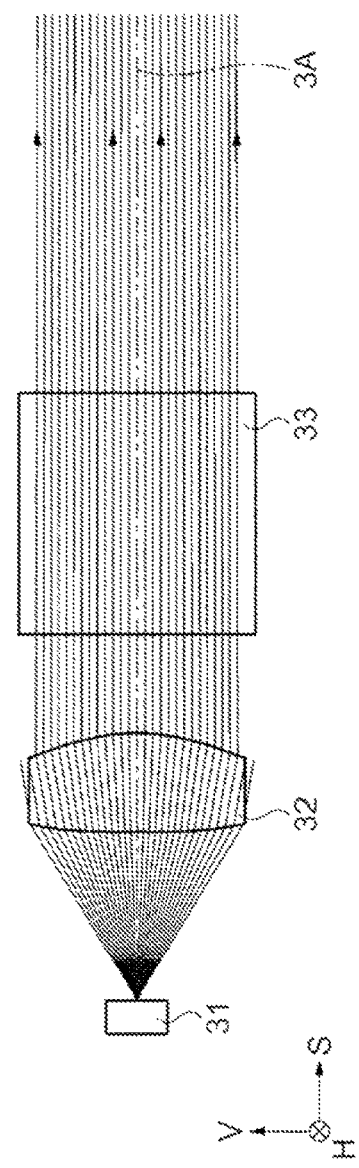
FIG. 6A
FIG. 6B

LIGHT OUTPUT APPARATUS AND IMAGE DISPLAY SYSTEM

BACKGROUND

1. Technical Field

The present invention relates to a light output apparatus and an image display system.

2. Related Art

There is a known coordinate input apparatus of related art that detects the position of a pointing device (pen or user's finger, for example) operated within a predetermined coordinate input area. A proposed example of a coordinate input apparatus of this type forms a light layer along a display surface on which an image is displayed and detects a position where the light is reflected off a pointing device when a predetermined position on the display surface is pointed with the pointing device for detection of the position pointed with the pointing device (see Japanese Patent No. 4,757,144, for example).

The coordinate input apparatus described in Japanese Patent No. 4,757,134 includes a coordinate input effective area that forms a display surface (display screen) of a display apparatus, a plurality of sensor units, a retroreflector provided along three outer sides of the coordinate input effective area and reflects incident light, and a control and computation unit. Each of the sensor units includes a light projection section that forms a light layer along the coordinate input effective area and a light reception section that receives light, and the light projection section has two infrared LEDs (light emitting diodes) each of which emits infrared light and two projection lenses each of which projects the infrared light over a range of about 90°.

The plurality of sensor units are formed, for example, of two sensor units that are disposed in positions in the vicinity of opposite ends of one of the four outer sides of the coordinate input effective area, which has a rectangular shape.

In the coordinate input apparatus, the plurality of sensor units detect a region where the light amount distribution changes in response to the action of a pointing device within the coordinate input effective area, and the control and computation unit calculates the coordinates of the pointing device in the coordinate input effective area based on the number of regions where the change occurs and the number of pen-down actions of the pointing device.

In the coordinate input apparatus described in Japanese Patent No. 4,757,144, however, since in each of the LEDs used in each of the light projection sections, the emitted light spreads as it travels, the emitted light spreads also in a direction away from the display surface, and the light from the infrared LED may therefore not be effectively used. As a result, the coordinate input apparatus described in Japanese Patent No. 4,757,144 may undesirably be incapable of detecting the position of the pointing device in a stable manner. Use of high-intensity LEDs to avoid the problem described above may result in an increase in power consumption and malfunction in detection due to an increase in difference in optical intensity between an area where light fluxes emitted from the two LEDs overlap with each other and an area where no overlap occurs.

Further, when the coordinate input effective area is formed of a projection surface on which a projector or any other apparatus projects an image, a variety of projection surfaces of different sizes are used, which requires adjustment of the positions of the plurality of sensor units in such a way that the light fluxes from the LEDs travel a Long the entire coordinate input effective area in correspondence to an employed projection surface. Moreover, in the coordinate input apparatus described in Japanese Patent No. 4,757,144, which includes the retroreflector, the retroreflector needs to be so configured that it can handle projection surfaces (coordinate input effective areas) of different sizes. As described above, the coordinate input apparatus described in Japanese Patent No. 4,757,144 has a problem of a complicated structure in the case where the coordinate input effective area is formed of a projection surface.

SUMMARY

An advantage of some aspects of the invention is to solve at least a part of the problems described above, and the invention cars be implemented in the following forms or application examples.

Application Example 1

A light output apparatus according to this application example includes a light source that emits light showing different light orientation distributions in a first direction and a second direction perpendicular to the first direction and having a high optical intensity irradiation angular area larger in the first direction than in the second direction, a collimator lens that parallelizes the light emitted from the light source, and a directional, lens that spreads the parallelized light from the collimator lens in the first direction, maintains the parallelized direction provided by the collimator lens in the second direction, and outputs the resultant light along a third direction that is perpendicular to the first and second directions and serves as a central axis.

In the thus configured light output apparatus, the collimator lens parallelizes the light emitted from the light source and having a high optical intensity area larger in the first direction than in the second direction, and then the directional lens spreads the parallelized light in the first direction but prevents the parallelized light from spreading in the second direction and outputs the resultant light along the third direction that serves as a central axis. Therefore, the light output apparatus provided in this application example, when it is so disposed that the first direction extends along a predetermined flat surface, can effectively use the light emitted from the light source and can output light along the flat surface based on a compact, simple configuration.

Application Example 2

In the light output apparatus according to the application example described above, it is preferable that the light output apparatus further includes a first light output section and a second light, output section each including the light source, the collimator lens, and the directional lens, and the first light output section and the second light output section are so disposed that part of the light having exited out of the first light output section and part of the light having exited out of the second light output section overlap with each other in the first direction.

According to the configuration described above, when the light output apparatus is so disposed that the first direction extends along a predetermined flat surface, an decrease in optical intensity in the area between the area over which the first light output section outputs light and the area over which the second light output section outputs light can be suppressed, and the light can be outputted over a wider area along the flat surface.

Application Example 3

In the light output apparatus according to the application example described above, it is preferable that the intensity of the light having exited out of each of the first light output section and the second light output section substantially peaks along the central axis and is at least 50% of the peak intensity in a direction inclined with respect to the central axis by 45°.

According to the configuration described above, when the light output apparatus is so disposed that the first direction extends along a predetermined flat surface, each of the first light output section and the second light output section can reliably output light of optical intensity of at least 50% of the peak intensity along the flat surface over a 90°-angular area around the central axis.

Application Example 4

In the light output apparatus according to the application example described above, it is preferable that the first light output section and the second light output section are so disposed when viewed in the second direction that extensions of the central axes intersect each other and each of the central axes is inclined with respect to a reference surface that passes through the intersection where the extensions intersect each other and extends in the second direction by an angle greater than or equal to 30° but smaller than or equal to 50°.

According to the configuration described above, since the central axis associated with each of the first light output section and the second light output section is inclined with respect to the reference surface by an angle greater than or equal to 30° but smaller than or equal to 50°, the optical intensity within an area along the inclined direction is high. Disposing the light output apparatus in a position in the vicinity of a central portion of one of the four sides of the flat surface, which has a rectangular shape, therefore allows high, intensity light to be directed toward portions in the vicinity of the corners of the flat surface that, are located in the farthest positions from the light output apparatus. The light output apparatus provided in this application example can therefore output light more efficiently along the entire rectangular flat surface based on a simple structure.

Application Example 5

An image display system according to this application example includes the light output apparatus described above, a detection apparatus that detects a position where the light outputted from the light output apparatus is reflected, and a projection apparatus that projects an image.

According to the configuration described above, the image display system, which includes the light output apparatus described above, can effectively use the light emitted from the light source to output light along an entire projection surface, such as a screen. Therefore, in the image display apparatus, the detection apparatus can stably detect the position of a pointing device that reflects the light outputted along the projection surface, and the projection apparatus can project an image according to a result of the detection on the projection surface, for example, an image containing a trajectory of the pointing device on the projection surface.

Further, the light output apparatus can handle a projection surface of a different size without necessity to add a special configuration to the projection surface, the image display system provided in this application example can be highly versatile.

Application Example 6

In the image display system according to the application example described above, it is preferable that the light output apparatus is disposed in a position not only separated from a rectangular projection surface on which the projection apparatus projects an image but also in the vicinity of a central portion of one of four sides of the projection surface, and that the intensity of light outputted from the first light output section toward one end of the one side when viewed in the second direction is at least 50% of a peak intensity, and the intensity of light outputted from the second light output section toward the other end of the one side is at least 50% of a peak intensity.

According to the configuration described above, the light output apparatus is disposed in a position in the vicinity of a central portion of one side of the rectangular projection surface as described above, and each of the first light output section and the second light output section outputs light of at least 50% of the peak intensity toward the ends of one side that forms the rectangular projection surface and is located in the vicinity of the light output apparatus. The light output apparatus provided in this application example can therefore output light over the entire projection surface including areas containing the corners that form the rectangular projection surface and are located in positions in the vicinity of the light output apparatus.

BRIEF DESCRIPTION OF THE DRAWINGS

The invention will be described with reference to the accompanying drawings, wherein like numbers reference like elements.

FIGS. 6A and 6B are diagrammatic views showing a first light output section in the present embodiment.

DESCRIPTION OF EXEMPLARY EMBODIMENTS

An image display system according to an embodiment of the invention will be described below with reference to the drawings.

Figure 1:
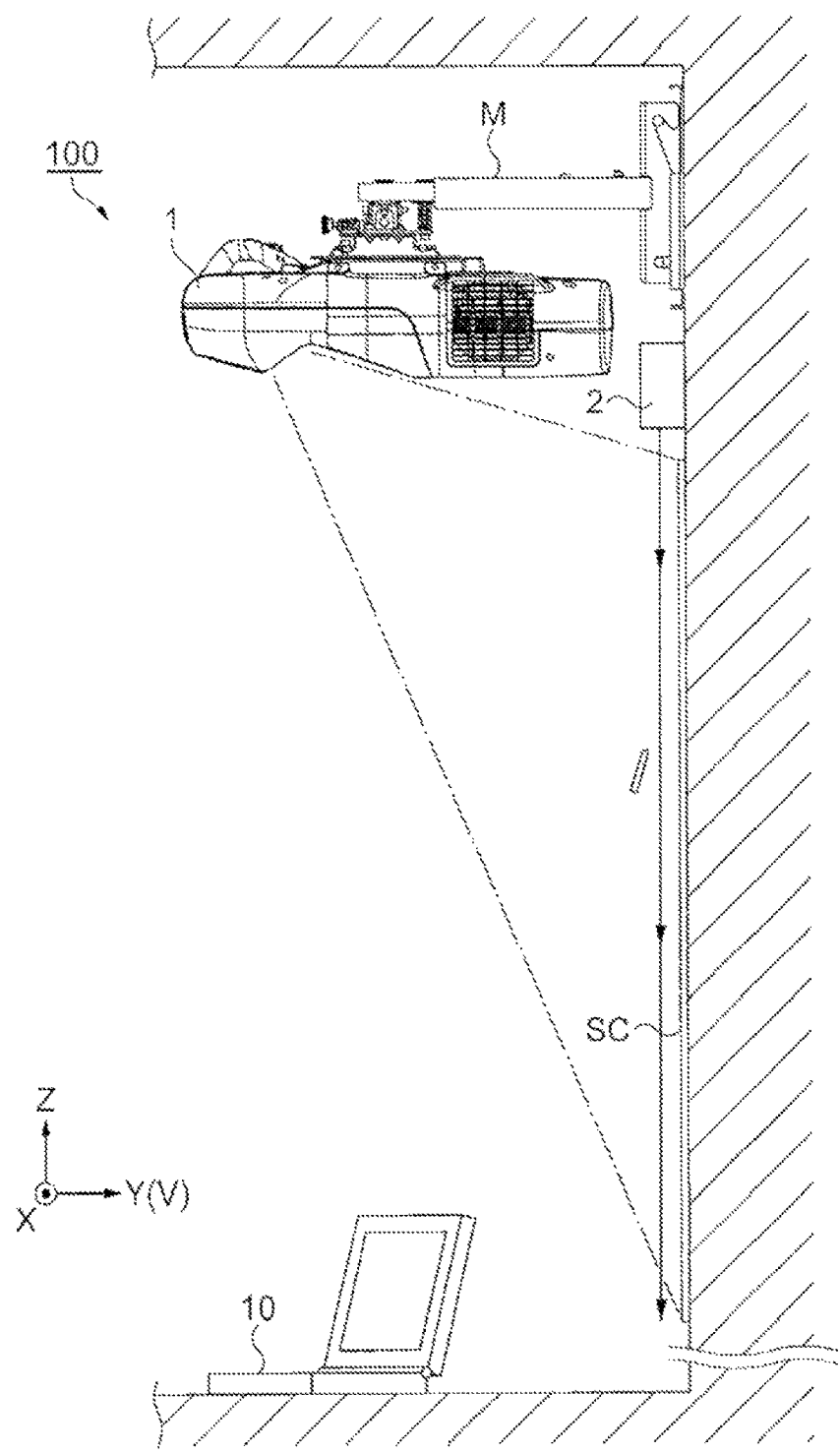
FIG. 1 is a diagrammatic view showing a schematic configuration of an image display system according to an embodiment of the invention.

FIG. 1 is a diagrammatic view showing a schematic configuration of an image display system 100 according to the present embodiment.

The image display system 100 according to the present embodiment includes a projector 1 and a light output apparatus 2, as shown in FIG. 1.

Figure 2:
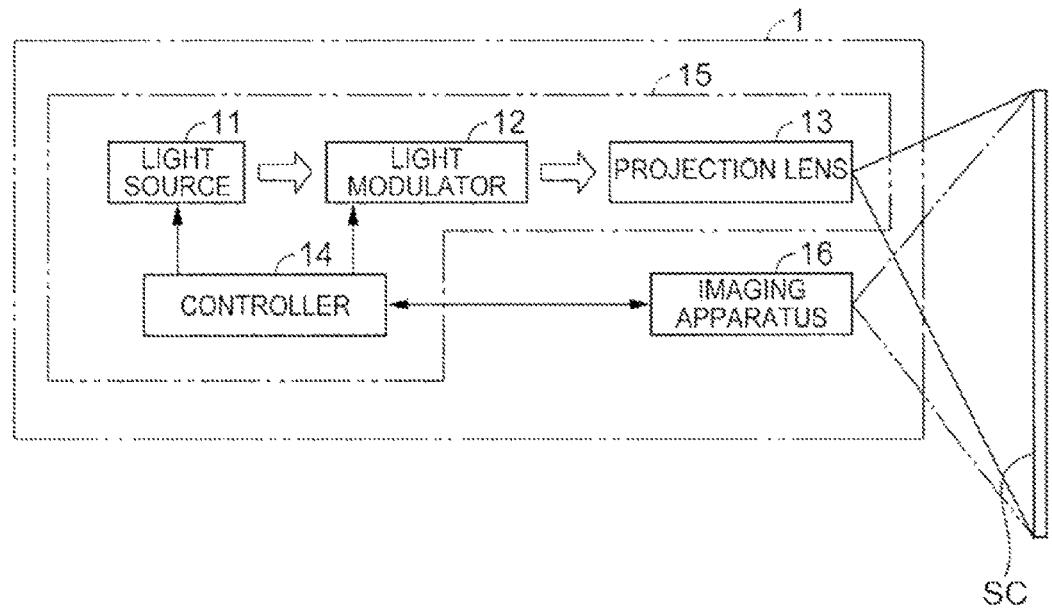
FIG. 2 is a block diagram showing a schematic configuration of a projector in the present embodiment.

FIG. 2 is a block diagram showing a schematic configuration of the projector 1.

The projector 1 includes a projection apparatus 15 and an imaging apparatus 16, which serves as a detection apparatus, and the projection apparatus 15 includes a light source 11, a light modulator 12, a projection lens 13, and a controller 14, as shown in FIG. 2. Although not shown, the projector 1 includes a signal input/output section that inputs and outputs image information from and to an image output apparatus 10, such as a PC (personal computer).

The projector 1 is supported by a support apparatus M installed on a wall surface above a projection surface SC, such as a screen, as shown in FIG. 1. For ease of the following description, the following definitions are made: The direction of a normal to the projection surface SC is a frontward/rearward direction; the direction toward the projection surface SC is a forward direction (+Y direction); the direction that opposes the gravity is an upward direction (+Z direction); and the right side in a case where the projection surface SC is viewed from the front is a right direction (+X direction), as shown in FIG. 1.

In the projector 1, light emitted from the light source 11 is modulated by the light modulator 12 in accordance with image information transmitted from the image output apparatus 10, and the modulated light is projected through the projection lens 13 onto the projection surface SC. The light modulator 12 can, for example, be a liquid-crystal-based device or a micromirror-type device, such as a DMD-based (digital-micromirror-device-based) device.

The controller 14 includes a CPU (central processing unit), a ROM (read only memory), and a RAM (random access memory), functions as a computer, and controls the action of the projector 1, for example, controls image projection.

The light output apparatus 2, the configuration of which will be described in detail later, is installed on the wall surface above the projection surface SC and outputs light along the projection surface SC, as shown in FIG. 1.

The imaging apparatus 16 includes a CCD (charge coupled device), a CMOS (complementary metal oxide semiconductor) device, or any other imaging device (not shown), captures an image of the projection surface SC as a subject, and outputs the imaged information to the controller 14. Further, when the light outputted from the light output apparatus 2 is reflected off a pointing device (pen or user's finger, for example), the imaging apparatus 16 detects the position where the light is reflected off the pointing device and outputs the detected information to the controller 14. The controller 14 outputs the information outputted from the imaging apparatus 16 to the image output apparatus 10 via the signal input/output section.

The image output apparatus 10 analyzes the position of the pointing device on the projection surface SC based on the information imaged by the imaging apparatus 16 and transmitted from the projector 1. The image output apparatus 10 then, based on a result of the analysis, generates an image in which the position of the pointing device is expressed with a point or a line and transmits the image to the projector 1. The projector 1 then projects, on the projection surface SC, an image containing, for example, a trajectory of the pointing device over the projection surface SC.

Configuration of Light Output Apparatus

Figure 3:
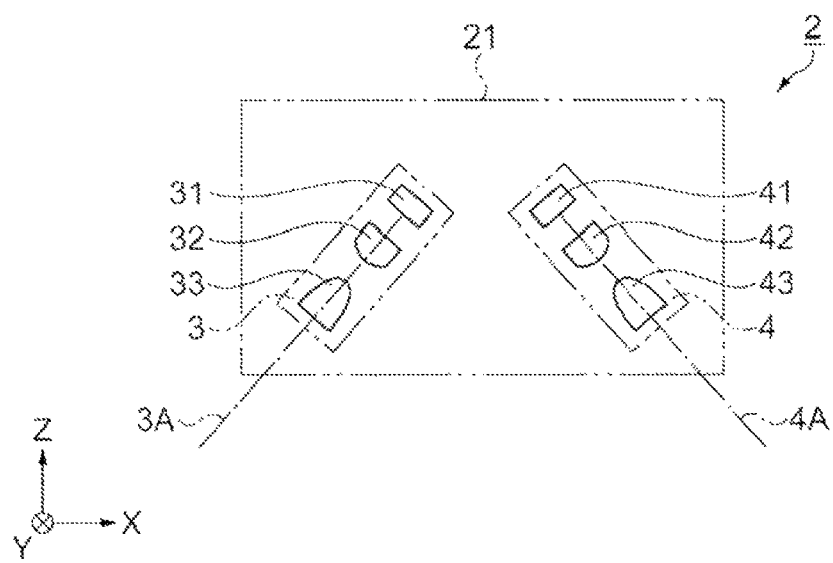
FIG. 3 is a diagrammatic view showing a schematic configuration of a light output apparatus in the present embodiment.

FIG. 3 is a diagrammatic view shoeing a schematic configuration of the light output apparatus 2.

The light output apparatus 2 includes a first light output section 3, a second light output section 4, and an enclosure 21, which accommodates the first light output section 3 and the second light output section 4, as shown in FIG. 3.

The first light output section 3 includes a light source 31, a collimator lens 32, and a Powell lens 33. The second light output section 4 includes a light source 41, a collimator lens 42, and a Powell lens 43, which are configured in the same manner as those in the first light output section 3. That is, the first light output section 3 and the second light output section 4 have a common configuration; the first light output section 3 outputs light emitted from the light source 31 via the collimator lens 32 and the Powell lens 33, and the second light output section 4 outputs light emitted from the light source 41 via the collimator lens 42 and the Powell lens 43. Each of the Powell lenses 33 and 43 corresponds to a directional lens.

The first light output section 3 and the second light output section 4 are then so angularly disposed that the distance between a central axis 3A of the light outputted from the first light output section 3 and a central axis 4A of the light outputted from the second light output section 4 increases along the direction in which the light outputted from the light output sections travels, as shown in FIG. 3.

Figure 4:
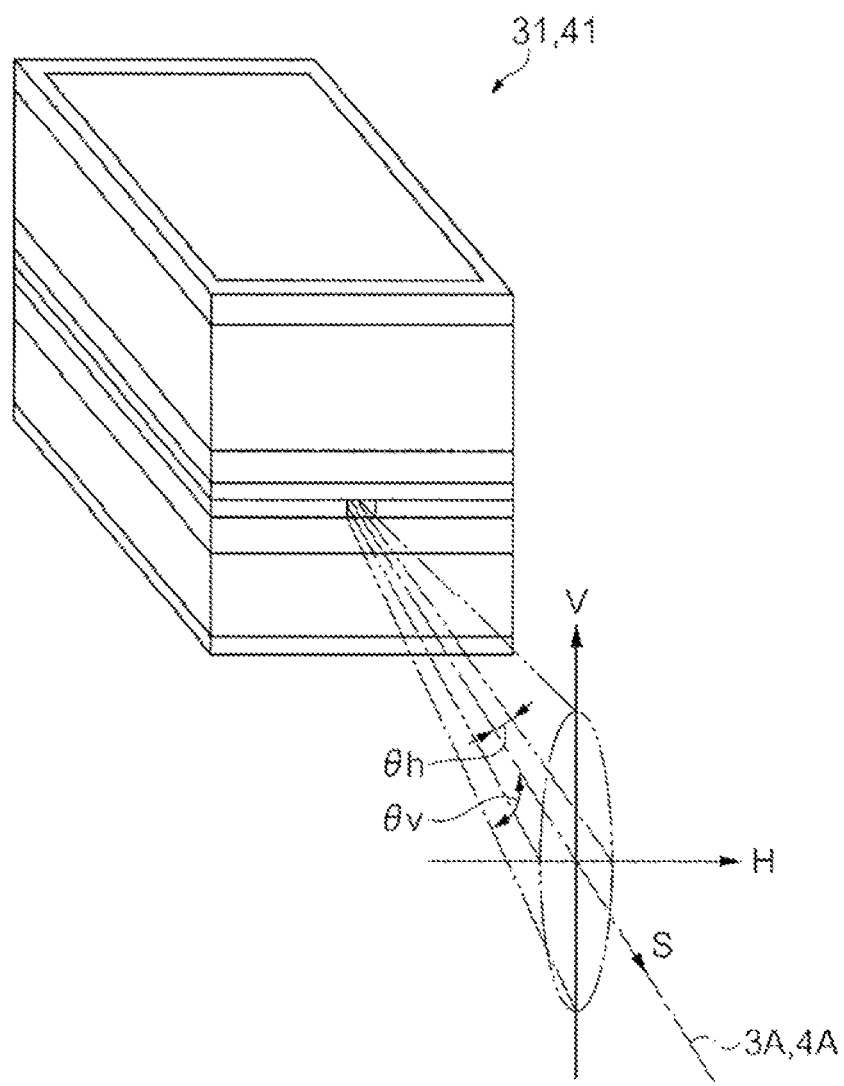
FIG. 4 is a diagrammatic view showing a light source in the light output apparatus in the present embodiment.
Figure 5A:
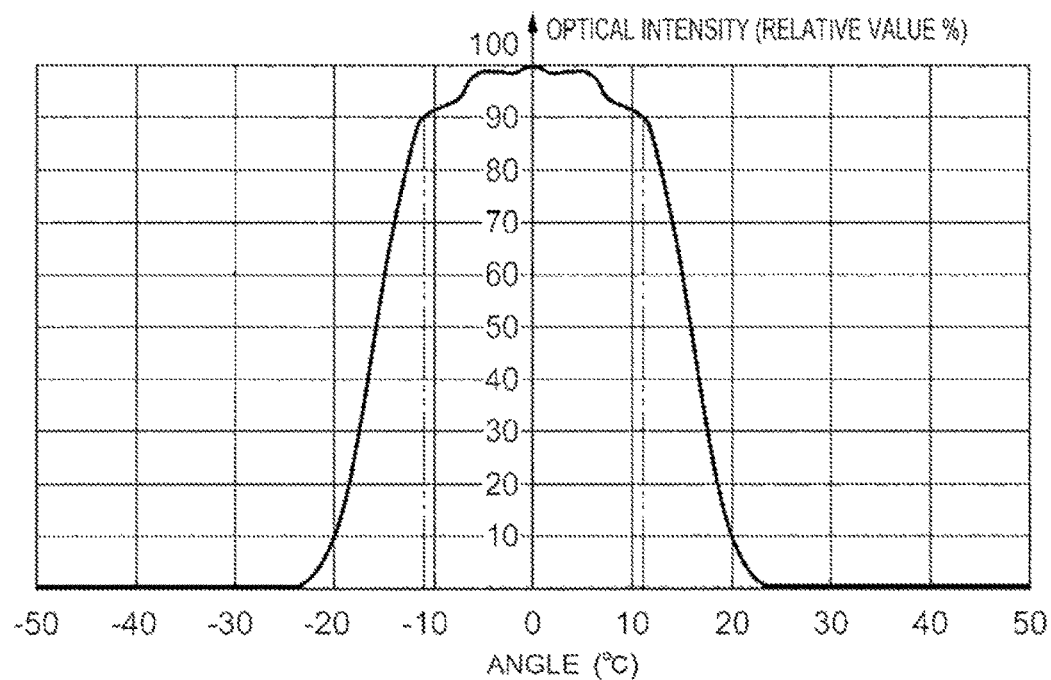
FIGS. 5A and 5B show exemplary light orientation distributions of light emitted from the light source in the light output apparatus in the present embodiment.
Figure 5B:
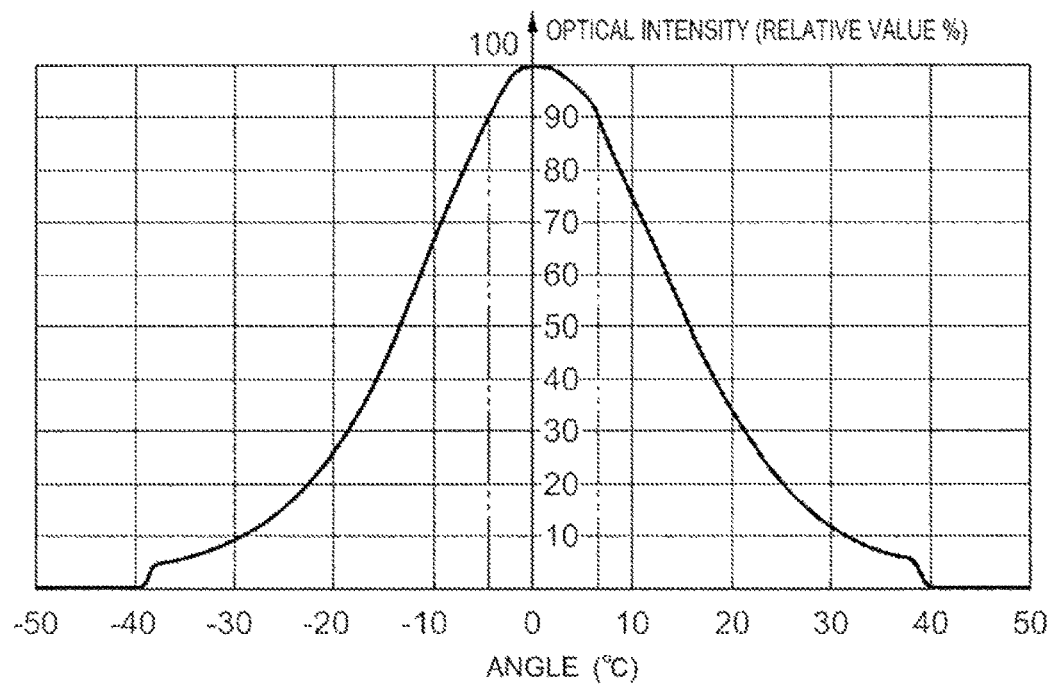

FIG. 4 is a diagrammatic view showing the light sources 31 and 41. FIGS. 5A and 5B show exemplary light orientation distributions of the light emitted from the light sources 31 and 41. FIG. 5A shows the light orientation distribution in a first direction H, and FIG. 5B shows the light orientation distribution in a second direction V.

Each of the light sources 31 and 41 is a laser light source that emits light the intensity of which peaks at a wavelength of about 940 nm and is formed of an active layer that is a light emitting portion, cladding layers disposed on opposite sides of the active layer, and other layers stacked on each other, as shown in FIG. 4. Each of the light sources 31 and 41 is a laser light source that shows a light orientation characteristic in the first direction H, which extends along the active layer, and a different light orientation characteristic in a direction which is perpendicular to the first direction and in which the active layer and the cladding layers are stacked on each other (second direction V), such as a multimode-lasing-type laser light source.

The light emitted from the light sources 31 and 41 angularly spreads with respect to the central axes 3A and 4A by a greater amount in the second direction V than in the first direction H and has a high intensity area larger in the first direction H than in the second direction V, as shown in FIGS. 4, 5A, and 5B. Specifically, an angle θv with respect to the central axes 3A and 4A that increases in the second direction V is greater than an angle θh with respect to the central axes 3A and 4A that increases in the first direction H, as shown in FIG. 4. The optical intensity is, for example, at least 90% of the peak intensity in an angular area within an angle of about ±12° on opposite sides of the central axes 3A and 4A in the first direction H and in an angular area within an angle of about ±5° on opposite sides of the central axes 3A and 4A in the second direction V, which means that the angular area in the first direction H is greater the angular area in the second direction V, as shown in FIGS. 5A and 5B.

As described above, each of the light sources 31 and 41 emits light showing different light orientation characteristics in the first direction H and the second direction V and having a high optical intensity irradiation angular area larger in the first direction H than in the second direction V.

A description will next be made of the collimator lenses 32 and 42 and the Powell lenses 33 and 43. Since the first light output section 3 and the second light output section 4 have a common configuration, the collimator lens 32 and the Powell lens 33 in the first light output section 3 as a representative example will be described.

FIGS. 6A and 6B are diagrammatic views showing the first light output section 3. FIG. 6A is the first light output section 3 viewed in the second direction V, and FIG. 6B is the first light output section 3 viewed in the first direction H.

The collimator lens 32 has a function of substantially parallelizing the light emitted from the light source 31. Specifically, the collimator lens 32 causes the light emitted from the light source 31 and spreading angularly with respect to the central axis 3A to travel substantially in parallel to the central axis 3A, as shown in FIGS. 6A and 6B.

The Powell lens 33 is so formed that it has a convex shape on the light incident side and a flat shape on the light exiting side when viewed in the second direction V as shown in FIG. 6A, and that it has a rectangular shape when viewed in the first direction H as shown in FIG. 6B.

The Powell lens 33 causes the parallelized light from the collimator lens 32 to spread in the first direction H as shown in FIG. 6A, maintains the parallelized direction provided by the collimator lens 32 in the second direction V as shown in FIG. 6B, and outputs the resultant light along a third direction S, which is perpendicular to the first direction H and the second direction V and serves as the central axis 3A.

Figure 7:
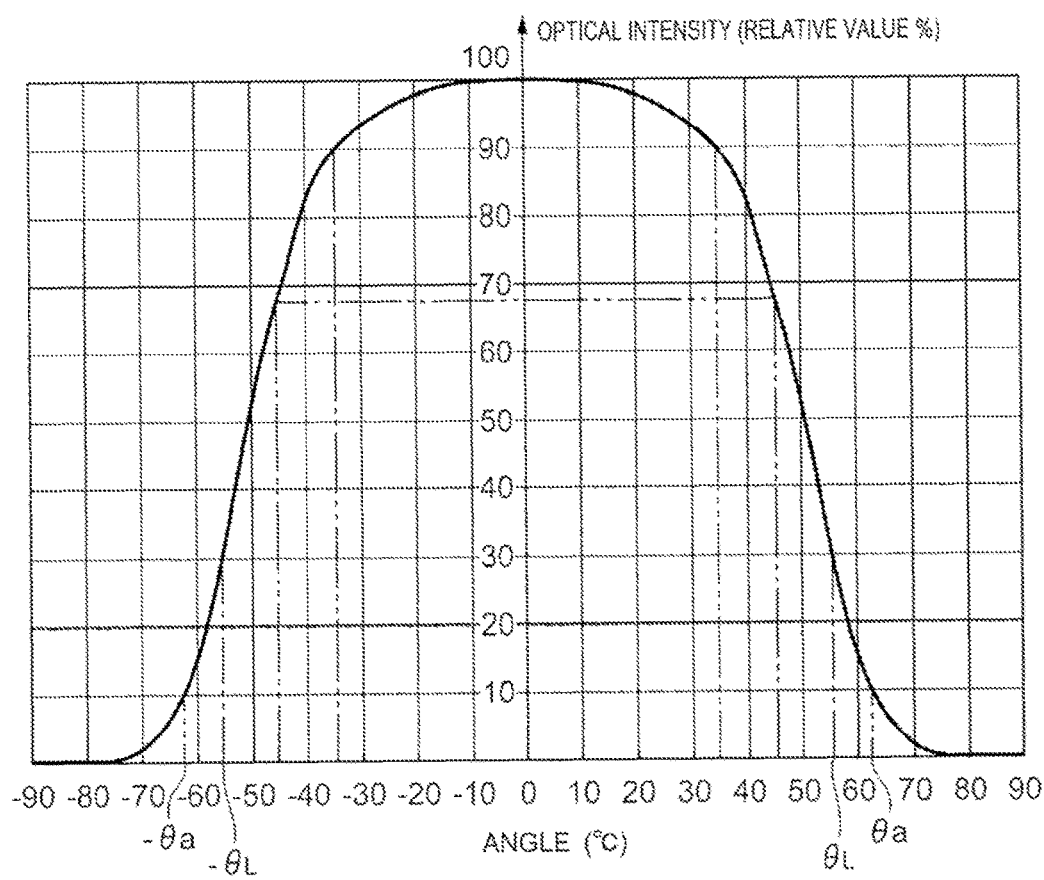
FIG. 7 shows the light orientation distribution of light having exited out of a Powell lens and in a first direction in the present embodiment.

FIG. 7 shows the light orientation distribution of the light having exited out of the Powell lens 33 and in the first direction H.

The light having exited out of the Powell lens 33 has a high optical intensity area larger than the high optical intensity area of the light emitted from the light source 31 (see FIG. 5A) in the first direction H, as shown in FIG. 7. Specifically, in the case of the light emitted from the light source 31, the angular area within an angle of about ±12° on opposite sides of the central axis 3A is the area where the optical intensity is at least 90% of the peak as described above, whereas in the case of the light having exited out of the Powell lens 33, an angular area within an angle of about ±35° is the high optical intensity area.

Further, the light having exited out of the Powell lens 33 is so formed that the intensity substantially peaks along the central axis 3A, and that in the first direction H, the intensity in a direction inclined with respect to the central axis 3A by 45° is at least 50% of the peak intensify. The first light output section 3 in the present embodiment is so configured that the intensity in the direction inclined with respect to the central axis 3A by 45° is at least about 67% of the peak intensity, as shown in FIG. 7.

The collimator lens 42 and the Powell lens 43 are formed in the same manner as the collimator lens 32 and the Powell lens 33, respectively.

Position Where Light Output Apparatus is Disposed

A description will now be made of the position where the light output apparatus 2 is disposed relative to the projection surface SC and the positional relationship between the first light output section 3 and the second light output section 4.

Figure 8:
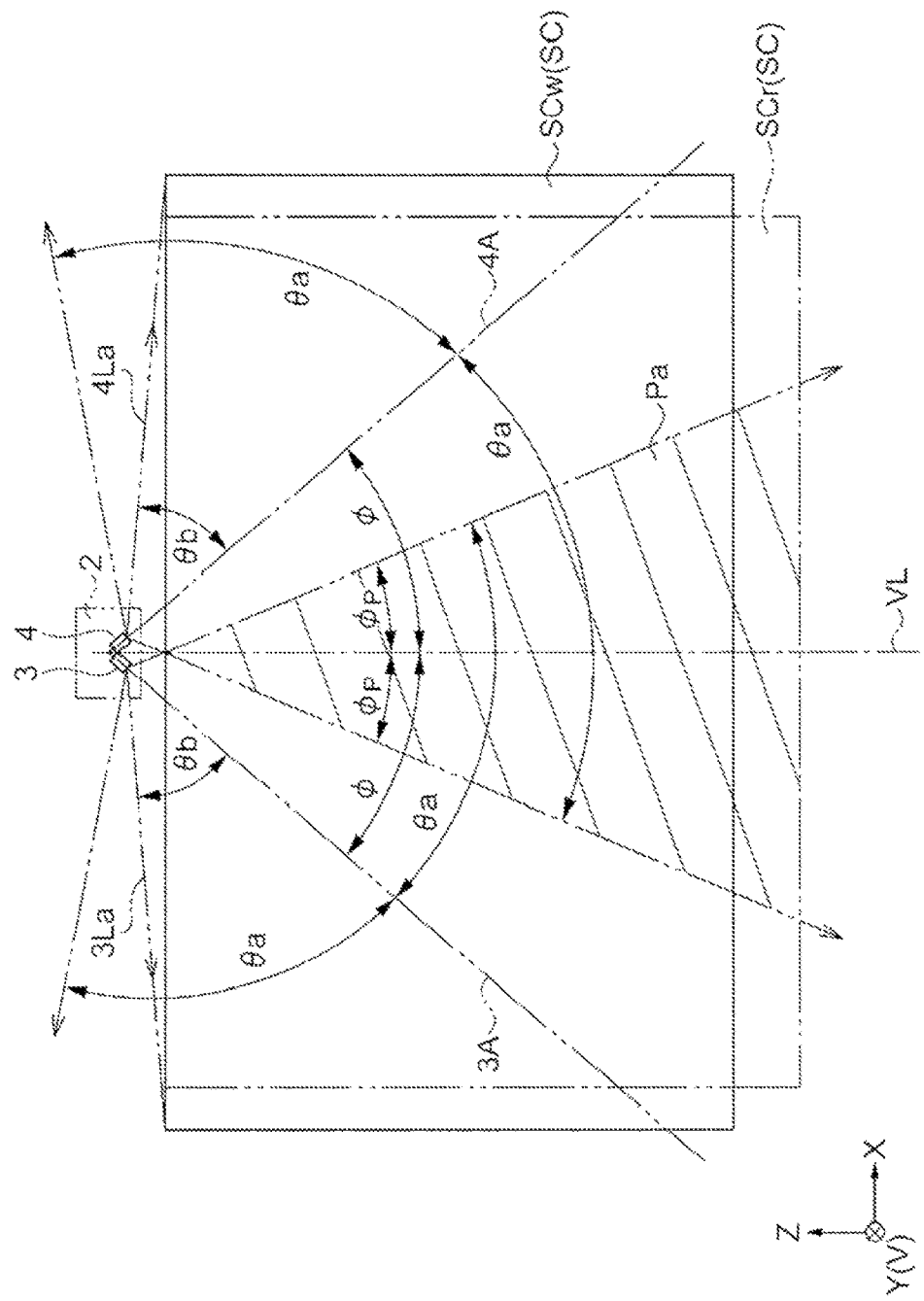
FIG. 8 is a diagrammatic view of a projection surface and the light output apparatus in the present embodiment viewed from a position in front of the projection surface.

FIG. 8 is a diagrammatic view of the projection surface SC and the light output apparatus 2 viewed from a position in front of the projection surface SC. FIG. 8 shows a screen SCw suitable for projection of an image having an aspect ratio of 16:9 and a screen SCr suitable for projection of an image having an aspect ratio of 4:3 by way of example, and each of the projection surfaces SC has a size of about 100 inches.

The light output apparatus 2 is installed on the wall surface above the projection surface SC with a separation between the light output apparatus 2 and the projection surface SC in such a way that the first direction H extends along the projection surface SC and the second direction V is perpendicular to the projection surface, that is, the second direction V coincides with the frontward/rearward direction, as shown in FIGS. 1 and 8. The first light output section 3 and the second light output section 4 are so disposed that part of the light outputted from the first light output section 3 and part of the light outputted from the second light output section 4 overlap with each other in the first direction H, as shown in FIG. 8. The thus disposed light output apparatus 2 outputs light along the entire projection surface SC.

Specifically, the light output apparatus 2 is disposed in a position in the vicinity of a central portion of the upper side among the four sides of the projection surface SC, which has a rectangular shape, as shown in FIG. 8. The light output apparatus 2 is further so disposed that the first light output section 3 is disposed in a position to the left of the second light output section 4, that an extension of the central axis 3A and an extension of the central axis 4A intersect each other in a position outside the projection surface SC, and that part of the light outputted from the first light output section 3 and part of the light outputted from the second light output section 4 overlap with each other in an area extending downward from the upper side of the projection surface SC when viewed from a position in front of the projection surface SC. The light output apparatus 2 is still further so disposed that a Y-Z plane (reference plane VL) passing through the intersection of the extension of the central axis 3A and the extension of the central axis 4A is positioned substantially at the center of the projection surface SC in the rightward/leftward direction. The reference plane VL is also a plane extending along the second direction V.

The first light output section 3 and the second light output section 4 are so disposed that they are symmetric with respect to the reference plane VL and that the central axes 3A and 4A of the first light output section 3 and the second light output section 4 are inclined with respect to the reference plane VL by an inclination angle φ. Specifically, the first light output section 3 and the second light output section 4 are so disposed that the inclination angle φ is greater than or equal to 30° but smaller than or equal to 50°. In the present embodiment, the first light output section 3 and the second light output section 4 are so disposed that the inclination angle φ is set at about 40°. That is, the light outputted from the first light output section 3 spreads with the optical intensity thereof having a peak in a position where the central axis 3A is inclined clockwise to the reference plane VL by 40°, and the light outputted from the second light output section 4 spreads with the optical intensity thereof having a peak in a position where the central axis 4A is inclined counterclockwise to the reference plane VL by 40°, as shown in FIG. 8.

The first light output section 3 is thus so disposed that in a left (−X side) portion of the projection surface SC with respect to the reference plane VL, the light outputted from the first light output section 3 and directed toward a point in the vicinity of the lower left corner of the projection surface SC, which is the farthest point from the light output apparatus 2, has a maximum intensity. The second light output section 4 is so disposed that in a right (+X side) portion of the projection surface SC with respect to the reference plane VL, the light from the second light output section 4 and directed toward a point in the vicinity of the lower right corner of the projection surface SC, which is the farthest point from the light output apparatus 2, has a maximum intensify.

Now, view the projection surface SC from a position in front thereof, and let an effective angle θa be the angle between each of the lines that connect portions of the first light output section 3 and the second light output section 4 from which they output light fluxes to the intersection of the upper side of the projection surface SC and the reference plane VL and the corresponding one of the central axes 3A and 4A, and let an effective area foe the angular area within the effective angle θa on both sides of each of the central axes 3A and 4A. The first light output section 3 and the second light output section 4 in the present embodiment are so disposed that the effective angle θa is 62°, and the optical intensify at the effective angle θa of 62° is set at about 10% of the peak intensity, as shown in FIG. 7.

Part of the effective area of the light outputted from the first light output section 3 and part of the effective area of the light outputted from the second light output section 4 overlap with each other. That is, since an angle φp of an overlapping area Pa on opposite sides of the reference plane VL satisfies the relationship φp=θa−φ, and θa≈62° and φ≈40° in the present embodiment, φp≈22, and the light that is outputted from the first light output section 3 and spreads over the effective area and the light that is outputted from the second light output section 4 and spreads over the effective area overlap with each other in a range of about ±22° on opposite sides of the reference plane VL.

Further, the distance from the first light output section 3 and the second light output section 4 to the upper side of the protection surface SC and the distance from the portion of the first light output section 3 from which it outputs light to the portion of the second light output section 4 from which it outputs light are, when viewed from a position in front of the projection surface SC, set at about 1/20 of the dimension of the screen SCw in the upward/downward direction. That is, the dimension from the reference plane VL to each of the portions of the first light output section 3 and the second light output section 4 from which they output light fluxes is set at about 1/40 of the dimension of the screen SCw in the upward/downward direction.

A description will now be made of the intensity of the light outputted from the light output apparatus 2 or the projection surface SC.

Figure 9A:
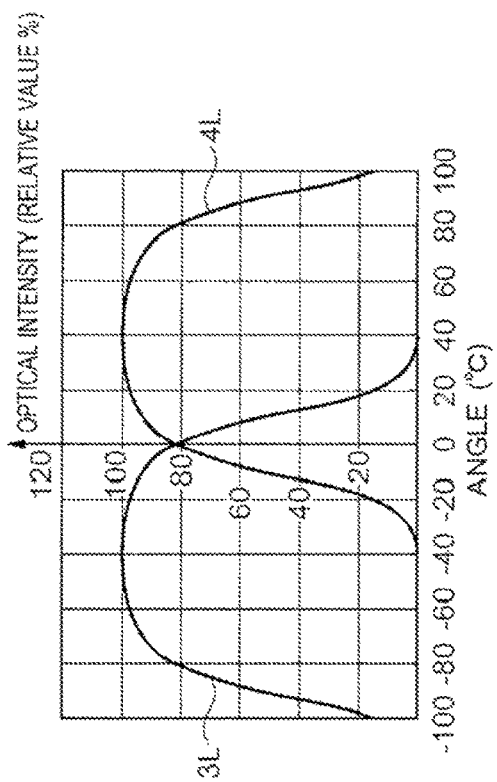
FIGS. 9A and 9B show the light orientation distribution of light outputted from the light output apparatus in the present embodiment.
Figure 9B:
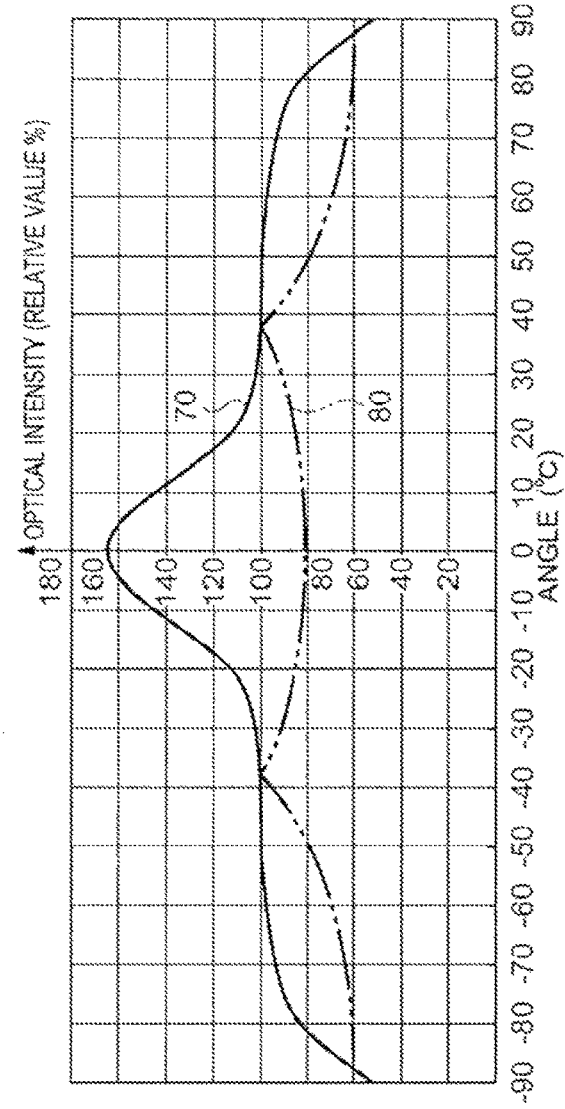

FIGS. 9A and 9B show the light orientation distribution of the light outputted from the light output apparatus 2, specifically, shows the relationship between the angle with respect to the reference plane VL and the optical intensity. Specifically, FIG. 9A shows a light orientation distribution 3L of the light outputted from the first light output section 3 and a light orientation distribution 4L of the light outputted from the second light output section 4 that are observed in a position set apart by a distance nearly equal to the distance from the light output apparatus 2 to the lower side of the screen SCw. FIG. 9B shows the optical intensity in positions corresponding to three sides (right and left sides and lower side) of the screen SCw and shows a light orientation distribution 70 of the combined light formed of the light outputted from the first light output section 3 and the light outputted from the second light output section 4 and an ideal light orientation distribution 80.

As the light outputted from the light output apparatus 2, since it is desired that light directed toward the right and left ends of the lower side of the projection surface SC, which are the farthest points from the light output apparatus 2, has a peak intensity, the ideal light orientation distribution 80 has, in the case of the screen SCw and among the positions corresponding to the three sides of the screen SCw, a peak occurs in a position roughly corresponding to the angle of 40° with respect to the reference plane VL, as shown in FIG. 9B.

On the projection surface SC in the vicinity of the light output apparatus 2, however, since the light fluxes outputted from the first light output section 3 and the second light output section 4 are directed toward, large angular positions with respect to the central axes 3A and 4A, the light resulting from the overlap between part of the light outputted from the first light output section 3 and part of the light outputted from the second light output section 4 has a low optical intensity.

Figure 10:
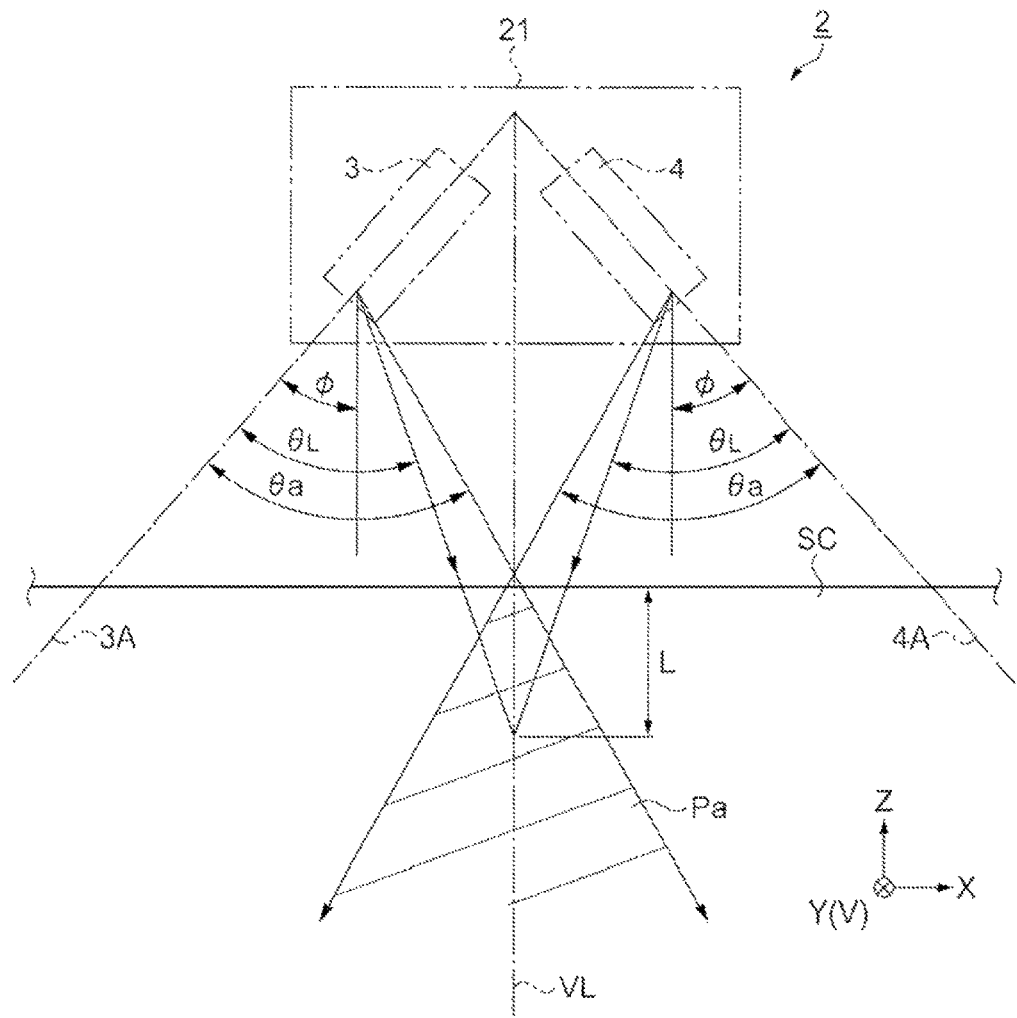
FIG. 10 is a diagrammatic view for describing light outputted along a screen in the vicinity of the light output apparatus in the present embodiment.

FIG. 10 is a diagrammatic view viewed from a position in front of the projection surface SC for describing the light outputted along the projection surface SC in the vicinity of the light output apparatus 2.

On the projection surface SC in the vicinity of the light output apparatus 2, the light fluxes outputted from the first light output section 3 and the second light output section 4 are directed toward larger angular positions with respect to the central axes 3A and 4A than in angular positions with respect thereto in the vicinity of the lower side of the projection surface SC, as shown in FIG. 10. Specifically, looking at a light ray corresponding to a distance L from the upper side of the projection surface SC to a position on the reference plane VL, one can find that the smaller the distance L, the greater an angle $\theta_L$ with respect to each of the central axes, as shown in FIG. 10, and the optical intensity decreases accordingly. For example, a light ray outputted from each of the first light output section 3 and the second light output section 4 and directed toward a point separated by the distance L corresponding to an angle $\theta_L$ of 55° has an intensity of about 30% of the peak as shown in FIG. 7, and the intensity of the combined light is about 60% of the peak of the intensity of the light outputted from each of the first light output section 3 and the second light output section 4.

On the other hand, in the position located on the reference plane VL and corresponding to the lower side of the projection surface SC, since the dimension from the reference plane VL to the portions of the first light output section 3 and the second light output section 4 from which they output light fluxes is set at about 1/40 of the dimension of the screen SCw in the upward/downward direction, the angle $\theta_L$ approximates the inclination angle φ (about 40° in the present embodiment) of the central axes 3A and 4A with respect to the reference plane VL. That is, in the position located on the reference plane VL and corresponding to the lower side of the screen SCw, since the intensity of the light outputted from each of the first light output section 3 and the second light output section 4 is about 80% of the peak as shown in FIG. 7 or the intensity of the combined light is about 160% as shown in FIG. 9B. In the area Pa, where the light outputted from, the first light output section 3 and the light outputted from the second light output section 4 overlap with each other, that is, in the angular area within about ±22° on opposite sides of the reference plane VL, the optical intensity is higher than those in the other areas.

As described above, the optical intensity in the area Pa, where the light outputted from the first light output section 3 in the effective area and the light outputted from the second light output section 4 in the effective area overlap with each other, varies depending on the distance from the light output apparatus 2, and in the present embodiment, the optical intensity is set to at least 20% even, at the projection surface SC in the vicinity of the light output apparatus 2.

Referring back to FIG. 8, the first light output section 3 outputs light having an intensity of at least 50% of the peak intensity toward the left (−X side) end of the upper side of the screen SCw, and the second, light output section 4 outputs light having an intensity of at least 50% of the peak intensity toward the right (+X side) end of the upper side of the screen SCw.

In the present embodiment, when the screen SCw is used, an angle θb between a light ray 3La, which is outputted from the first light output section 3 and directed toward the upper left end of the screen SCw, and the central axis 3A is about 45°, and the intensity of the light ray 3La in the light orientation distribution is about 67% of the peak intensity (see FIG. 7). Similarly, an angle θb between a light ray 4La, which is outputted from the second light output section 4 and directed toward the upper right end of the screen SCw, and the central axis 4A is about 45°, and the intensity of the light ray 4La in the light orientation distribution is about 67% of the peak intensity (see FIG. 7). It is noted that the enclosure 21 is provided with a light blocker that prevents the light outputted from the light output apparatus 2 from traveling toward a portion above the projection surface SC.

The light output apparatus 2, in which the first light output section 3 and the second light output section 4 are disposed in correspondence with the projection surface SC as described above, outputs light along the entire projection surface SC.

As described above, the present embodiment can provide the following advantageous effects.

(1) The light output apparatus 2 causes light to travel as follows: The collimator lenses 32 and 42 parallelize the light fluxes emitted from the light sources 31 and 41 and having a high optical intensity area larger in the first direction H than in the second direction V, and then the Powell lenses 33 and 43 spread the parallelized light fluxes in the first direction H but prevent them from spreading in the second direction V. The light output apparatus 2 provided in the present embodiment can therefore effectively use the light fluxes emitted from the light sources 31 and 41 and can output light along the projection surface SC based on a compact, simple configuration.

(2) The intensities of the light fluxes outputted from the first light output section 3 and the second light output section 4 substantially peak along the central axes 3A and 4A and are at least 50% of the peak intensity along the directions inclined with respect to the central axes 3A and 4A by 45°. The first light output section 3 and the second light output section 4 can therefore reliably output light fluxes of optical intensity of at least 50% of the peak intensity along the projection surface SC over 90°-angular areas around the central axes 3A and 4A.

(3) Since the first light output section 3 and the second light output section 4 are so disposed that part of the light outputted from the first light output section 3 and part of the light outputted from the second light output section 4 overlap with each other in the first direction H, an decrease in optical intensity in the area between the area over which the first light output section 3 outputs light and the area over which the second light output section 4 outputs light can be suppressed, and the light can be outputted over a wider area along the projection surface SC.

(4) Each of the first light output section 3 and the second light output section 4 outputs light of at least 50% of the peak intensity toward the ends of one side that forms the rectangular projection surface SC and is located in the vicinity of the light output apparatus 2. The light output apparatus 2 provided in the present embodiment can therefore output light over the entire projection surface SC including areas containing the corners that form the rectangular projection surface SC and are located in positions in the vicinity of the light output apparatus 2.

(5) Since the first light output section 3 and the second light output section 4 are so disposed that the light directed toward points in the vicinity of the corners of the projection surface SC that are farthest from the light output apparatus 2 has a maximum, intensity, the light can be more efficiently outputted along the entire projection surface SC.

(6) Since the light output apparatus 2 is disposed in a position in the vicinity of one of the four sides of the rectangular projection surface SC, the light output apparatus 2 can be used with a projection surface SC of a different sire without adjustment of the positions and other factors of the first light output section 3 and the second light output section 4.

(7) Since the image display system 100 includes the light output apparatus 2, the position of a pointing device on the projection surface SC can foe stably detected, and an image according to a result of the detection, for example, an image containing a trajectory of the pointing device on the projection surface SC can be projected on the projection surface SC.

Further, since the light output apparatus 2 can handle a projection surface SC of a different size without necessity to add a special configuration to the projection surface SC, the image display system 100 provided in the present embodiment can be highly versatile.

(8) Since the light output apparatus 2 outputs light of a longer wavelength band (about 940 nm) than the wavelength of light used with a remote control or any other device or light primarily emitted from a fluorescent lamp, the projector 1 can stably detect the position of a pointing device on the projection surface SC without malfunction due to the light outputted from the remote control, the fluorescent, lamp, and other devices and can therefore project an image according to a result of the detection.

Variations

The embodiment described above may be changed as follows.

The light output apparatus 2 in the embodiment described above is configured to be installed in a position above the projection surface SC, but the light output apparatus 2 may instead be configured to be disposed in a sideways position next to the projection surface SC or in a position below the projection surface SC. Further, in the embodiment described above, the light output apparatus 2 is configured to be installed on a wall surface, but the front surface of a whiteboard or any other apparatus may be used as the projection surface SC and the light output apparatus 2 may be so configured that it can be installed at an edge of the whiteboard or any other apparatus.

The light output apparatus 2 in the embodiment described above includes two light output sections (first light output section 3 and second, light output section 4), but the number of light output sections is not limited to two and light output apparatus 2 may instead include one light output section or three or more light output sections.

In the light output apparatus 2 in the embodiment described above, the inclination angle φ, the shape of the Powell lenses 33 and 43, and other factors are so set that the size of the projection surface SC is suitable for the screens SCw and SCr, each of which is about 100 inches in size, but the inclination angle φ, the shape of the Powell lenses 33 and 43, and other factors may be set in correspondence with sizes in addition to 100 inches and aspect ratios suitable for projection of images having aspect ratios in addition to 16:9 and 4:3.

Each of the light sources 31 and 41 in the light output apparatus 2 in the embodiment described above is formed of a laser light source but is not necessarily formed of a laser light source. For example, a plurality of highly directional LEDs may be arranged in line, and the direction in which the LEDs are arranged may be the first direction H.

The embodiment described, above has been described with reference to the configuration in which the front-projection projector 1, which projects an image from a position in front of a screen, is used as part of the image display system 100, but the invention is not necessarily configured this way and any configuration using an apparatus that displays an image may be used as part of the image display system 100. For example, a rear-projection projector, which projects an image from a position behind a screen, may instead be used, or a screen on which an image is projected, may be replaced with a liquid crystal display, a CRT (cathode ray tube), a plasma display, an organic EL display, or any other apparatus.

The entire disclosure of Japanese Patent Application No. 2013-226551, filed Oct. 31, 2013 and Japanese Patent Application No. 2014-042453, filed Mar. 5, 2014 are expressly incorporated by reference herein.

What is claimed is:

1. A light output apparatus comprising:
   first and second light output sections that project light onto a projection surface and that are i) closer to the center of an upper side of the projection surface than the ends of the upper side, and ii) each positioned on different sides of a plane passing through the center of the upper side, each of the first and second light output sections including:
   a light source that emits light showing different light orientation distributions in a first direction and a second direction perpendicular to the first direction and having a high optical intensity irradiation angular area larger in the first direction than in the second direction;
   a collimator lens that parallelizes the light emitted from the light source; and
   a directional lens that spreads the parallelized light from the collimator lens in the first direction, maintains the parallelized direction provided by the collimator lens in the second direction, and outputs the resultant light along a third direction that is perpendicular to the first and second directions and serves as a central axis,
   the collimator and directional lenses being configured to direct the resultant light onto the projection surface to have a maximum intensity at the farthest portion of the projection surface from the light source.

2. The light output apparatus according to claim 1, further comprising
   a first light output section and a second light output section each including the light source, the collimator lens, and the directional lens,
   wherein the first light output section and the second light output section are so disposed that part of the light having exited out of the first light output section and part of the light having exited out of the second light output section overlap with each other in the first direction.

3. The light output apparatus according to claim 2,
   wherein an intensity of the light having exited out of each of the first light output section and the second light output section substantially peaks along the central axis and is at least 50% of a peak intensity in a direction inclined with respect to the central axis by 45°.

4. The light output apparatus according to claim 2,
   wherein the first light output section and the second light output section are so disposed when viewed in the second direction that extensions of the central axes intersect each other and each of the central axes is inclined with respect to a reference surface that passes through the intersection where the extensions intersect each other and extends in the second direction by an angle greater than or equal to 30° but smaller than or equal to 50°.

5. An image display system comprising:
   the light output apparatus according to claim 2,
   a detection apparatus that detects a position where the light outputted from the light output apparatus is reflected; and
   a projection apparatus that projects an image.

6. An image display system comprising:
   the light output apparatus according to claim 3,
   a detection apparatus that detects a position where the light outputted from the light output apparatus is reflected; and
   a projection apparatus that projects an image.

7. An image display system comprising:
   the light output apparatus according to claim 4,
   a detection apparatus that detects a position where the light outputted from the light output apparatus is reflected; and
   a projection apparatus that projects an image.

8. The image display system according to claim 5,
   wherein the light output apparatus is disposed in a position not only separated from a rectangular projection surface on which the projection apparatus projects an image but also in the vicinity of a central portion of one of four sides of the projection surface, and
   an intensity of light outputted from the first light output section toward one end of one side when viewed in the second direction is at least 50% of a peak intensity, and an intensity of light outputted from the second light output section toward another end of the one side is at least 50% of a peak intensity.

* * * * *